(12) United States Patent
Willard et al.

(10) Patent No.: US 8,042,856 B2
(45) Date of Patent: Oct. 25, 2011

(54) COMPACTLY STORED TRI-FOLD CONVERTIBLE TOP

(75) Inventors: Michael T. Willard, Harrison Township, MI (US); Jan Just, Bloomfield Hills, MI (US)

(73) Assignee: Magna Car Top Systems GmbH, Troy, MI (US)

( * ) Notice: Subject to any disclaimer, the term of this patent is extended or adjusted under 35 U.S.C. 154(b) by 836 days.

(21) Appl. No.: 11/862,219

(22) Filed: Sep. 27, 2007

(65) Prior Publication Data

US 2009/0085369 A1    Apr. 2, 2009

(51) Int. Cl.
*B60J 7/08* (2006.01)

(52) U.S. Cl. ............... 296/107.01; 296/122; 296/107.08; 296/108

(58) Field of Classification Search ............. 296/146.11, 296/107.01, 107.09, 17.08, 216.01, 216.05, 296/107.07, 107.08, 122, 108, 116, 117; 160/192
See application file for complete search history.

(56) References Cited

U.S. PATENT DOCUMENTS

| | | | |
|---|---|---|---|
| 1,622,899 A * | 3/1927 | Barnes | 296/107.08 |
| 2,704,225 A | 7/1951 | Anscheutz et al. | |
| 2,768,857 A * | 10/1956 | Albrecht | 296/117 |
| 5,209,544 A | 5/1993 | Benedetto et al. | |
| 5,769,483 A | 6/1998 | Danzl et al. | |
| 6,048,021 A | 4/2000 | Sautter, Jr. | |
| 6,283,532 B1 | 9/2001 | Neubrand | |
| 6,299,233 B1 | 10/2001 | Mentink | |
| 6,334,644 B1 | 1/2002 | Gurtler et al. | |
| 6,336,673 B1 | 1/2002 | Rothe et al. | |
| 6,390,530 B1 | 5/2002 | Maass | |
| 6,419,308 B1 * | 7/2002 | Corder et al. | 296/216.02 |
| 6,464,284 B2 | 10/2002 | Neubrand | |
| 6,478,362 B2 | 11/2002 | Obendiek | |
| 6,497,446 B2 * | 12/2002 | Obendiek | 296/107.17 |
| 6,497,447 B1 * | 12/2002 | Willard | 296/108 |
| 6,502,891 B2 | 1/2003 | Russke | |
| 6,578,899 B2 * | 6/2003 | Hasselgruber et al. | 296/107.08 |
| 6,592,168 B2 * | 7/2003 | Hasselgruber et al. | 296/107.01 |
| 6,592,169 B2 | 7/2003 | Obendiek | |

(Continued)

FOREIGN PATENT DOCUMENTS

WO    WO 2005/084289    9/2005

OTHER PUBLICATIONS

International Search Report and The Written Opinion Of The International Searching Authority, or the Declaration for International Application No. PCT/US 08/77429, Sep. 24, 2008, 11 pages.

*Primary Examiner* — Glenn Dayoan
*Assistant Examiner* — Pinel Romain
(74) *Attorney, Agent, or Firm* — Brooks Kushman P.C.

(57) ABSTRACT

A tri-fold convertible top is disclosed that is stowed in a storage compartment with a five bow oriented at an angle of between 30° and 60° relative to the vehicle belt line. The top may be tensioned by a power cylinder and linkage that raises both a one bow and the five bow when the top is initially retracted. A main power cylinder is connected to the top stack and a main pivot bracket that lifts a rear rail above the belt line during the extension and retraction cycle.

11 Claims, 14 Drawing Sheets

U.S. PATENT DOCUMENTS

| | | | | |
|---|---|---|---|---|
| 6,619,722 B1 * | 9/2003 | Brown | | 296/136.05 |
| 6,629,719 B2 * | 10/2003 | Sims | | 296/109 |
| 6,637,802 B2 | 10/2003 | Obendiek | | |
| 6,644,715 B1 * | 11/2003 | Bohnke | | 296/107.08 |
| 6,659,533 B1 | 12/2003 | Grubbs | | |
| 6,666,494 B2 | 12/2003 | Antreich | | |
| 6,672,645 B2 | 1/2004 | Quindt | | |
| 6,682,149 B1 * | 1/2004 | Guillez et al. | | 296/108 |
| 6,695,386 B1 | 2/2004 | Willard | | |
| 6,705,662 B2 * | 3/2004 | Sande | | 296/107.08 |
| 6,796,595 B2 * | 9/2004 | Doncov | | 296/107.09 |
| 6,832,805 B2 | 12/2004 | Quindt et al. | | |
| 6,843,523 B2 | 1/2005 | Nania | | |
| 6,866,324 B2 | 3/2005 | Neubrand et al. | | |
| 7,014,247 B2 | 3/2006 | Dilluvio | | |
| 7,021,695 B2 | 4/2006 | Quindt et al. | | |
| 7,163,255 B2 * | 1/2007 | Rawlings et al. | | 296/116 |
| 7,175,224 B2 * | 2/2007 | Held | | 296/102 |
| 7,497,499 B2 * | 3/2009 | Halbweiss et al. | | 296/128 |
| 7,857,374 B2 * | 12/2010 | Weismuller et al. | | 296/124 |
| 2001/0024050 A1 * | 9/2001 | Schutt et al. | | 296/107.08 |
| 2001/0048231 A1 * | 12/2001 | Ellermann et al. | | 296/136 |
| 2002/0084673 A1 | 7/2002 | Neubrand | | |
| 2003/0020296 A1 * | 1/2003 | Koch et al. | | 296/107.08 |
| 2003/0189355 A1 * | 10/2003 | Hahn et al. | | 296/107.08 |
| 2004/0036312 A1 * | 2/2004 | Eichholz et al. | | 296/107.08 |
| 2004/0046414 A1 * | 3/2004 | Grubbs | | 296/107.09 |
| 2005/0200158 A1 | 9/2005 | Willard | | |
| 2006/0097542 A1 | 5/2006 | Dilluvio | | |
| 2006/0125282 A1 * | 6/2006 | Theuerkauf | | 296/107.07 |
| 2006/0186694 A1 * | 8/2006 | Wagner | | 296/107.08 |
| 2006/0249978 A1 * | 11/2006 | Rosler et al. | | 296/107.08 |
| 2006/0255620 A1 | 11/2006 | MacNee, III et al. | | |
| 2007/0170750 A1 | 7/2007 | Just et al. | | |
| 2008/0067832 A1 * | 3/2008 | Bunsmann et al. | | 296/107.08 |
| 2008/0197666 A1 * | 8/2008 | Brockhoff | | 296/107.08 |

* cited by examiner

COMPACTLY STORED TRI-FOLD CONVERTIBLE TOP

BACKGROUND OF THE INVENTION

1. Field of the Invention

The present invention relates to a tri-fold convertible top that is mounted on a linkage that stores the convertible top in a storage compartment having an angled floor and that is mounted on a four bar link that rotates the rear rail and front end of the five bow below the main pivot bracket.

2. Background Art

Convertible tops for vehicles must have robust linkages that are used to compactly store the convertible top in the storage compartment. Most storage compartments for convertible tops have a generally horizontally oriented floor on which the bows and other linkage parts are stored in a generally horizontal orientation. Convertible top linkages, when in their extended position, generally provide for an over-center locking of the top which is secured to the windshield header by latch mechanisms to hold the top in place.

Flat bottom convertible storage top compartments require substantial space and protrude into the rear area of the trunk. The most important portion of the trunk storage space to preserve is the storage space that is closest to the rear of the vehicle because it is easier to reach from the rear of the vehicle. There is a need for a convertible top that may be compactly stored at an angle in a storage compartment having a floor that is raised toward the rear and lower on its front edge. There is also a need for a convertible top that is lowered on a four bar link and placed in the storage compartment and lifted on the four bar link in the course of the top extension and retraction cycle to clear the front edge of the storage compartment. These and other problems are addressed by Applicants' invention as summarized below.

SUMMARY OF THE INVENTION

According to one aspect of the present invention, a convertible top for a vehicle is provided that has a one bow supported between two front roof rails that is selectively secured to a windshield header. The one bow and front rails are moved by a first pair of four bar links located on opposite sides of the top. Two side rails are each secured on their forward end to one of the front rails. The side rails and a fore-and-aft control link, or extension link, form part of the first pair of four bar links. Two rear rails are each secured on an upper end of the rear rails to one of the side rails. Two balance links are each secured to one of the fore-and-aft control links so that the rear rails and balance links form part of a second pair of four bar links on opposite sides of the top. The second pair of four bar links is operatively connected to the first pair of four bar links. A third pair of four bar links may connect the second pair of four bar links and a pair of main pivot brackets that are attached to the vehicle below the belt line of the vehicle. A power cylinder is operatively connected to at least one of the third pair of four bar links that acts on the third pair of four bar links to lift a lower end of the rear rails above the belt line of the vehicle during an extension cycle and during a retraction cycle. A cover is supported by the plurality of bows that extend transversely across the vehicle.

According to another aspect of the present invention, a convertible top for a vehicle is provided that has a front rail that is inverted by rotating the first rotary direction as the roof is retracted by the action of a first four bar link. A side rail forms part of the first four bar link and is rotated in a second rotary direction opposite the first rotary direction as the roof is retracted. A rear rail that forms part of a second four bar link rotates in the first rotary direction as the roof is retracted. A vehicle-engaging bow, or five bow, is rotated in the second rotary direction as the roof is retracted. The vehicle-engaging bow is operatively connected to the rear rail and the first four bar link that initially lifts the vehicle-engaging bow as the roof is retracted and then lowers the vehicle-engaging bow into a storage compartment. The second four bar link compresses the front roof rail, side rail and rear rail into engagement with the vehicle engaging bow when the top is fully retracted and stowed in a storage compartment. The top may be stored with the vehicle-engaging bow engaging a compartment bottom wall that is oriented in an angle of more than 30° relative to a plane defining the belt line of the vehicle.

According to another aspect of the invention, a convertible top is provided for a vehicle that has a windshield header and a rear decklid at a belt line of the vehicle. The convertible top includes a roof cover that extends from the windshield header to the rear decklid when the top is extended. A linkage supports the roof cover and includes a rearmost bow, or five bow, that is disposed to lie upon the rear decklid at the belt line when the top is extended. The rearmost bow is moved by the linkage into a position in which it is oriented at an angle of between 30° and 60° relative to the belt line when the top is retracted into the storage compartment.

These and other aspects of the present invention will be better understood in view of the attached drawings and the following detailed description of the illustrated embodiments of the invention.

BRIEF DESCRIPTION OF THE DRAWINGS

FIG. 6A is a fragmentary exploded perspective view of the embodiment of FIG. 6;

DETAILED DESCRIPTION OF THE PREFERRED EMBODIMENT(S)

Figure 1:
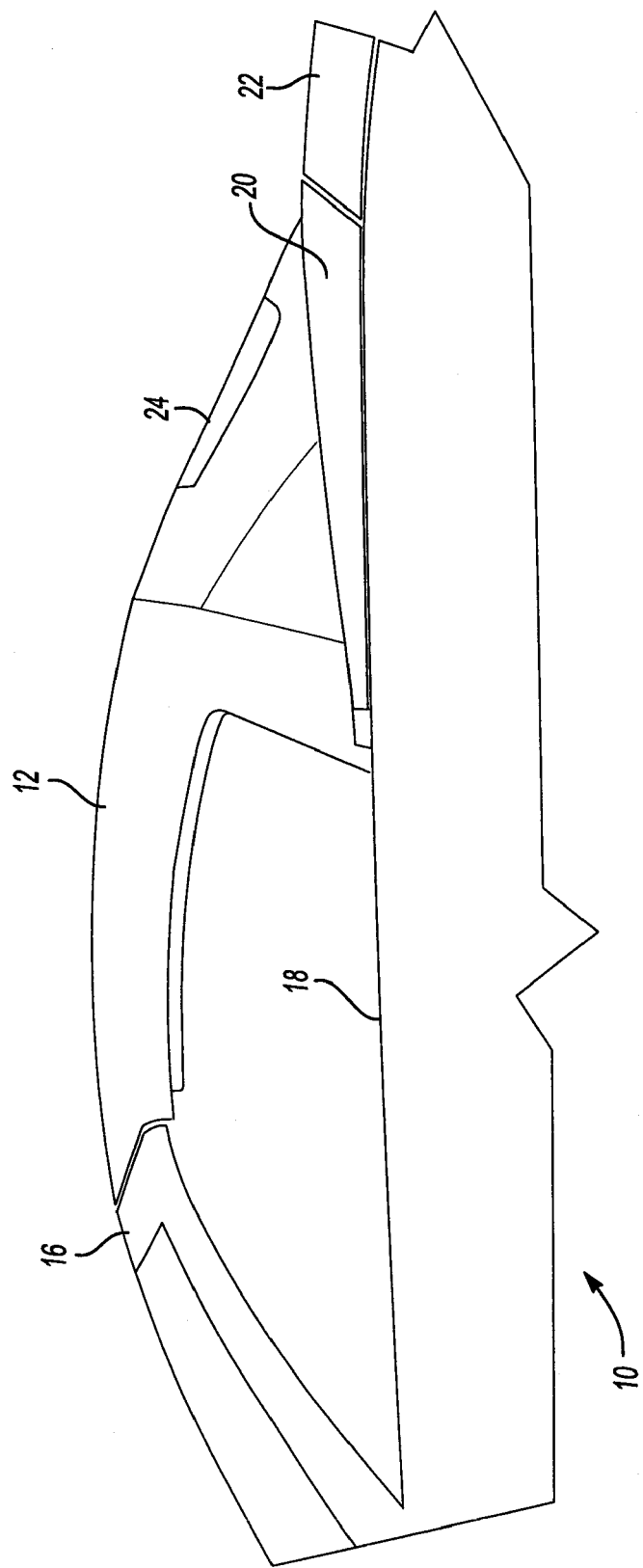
FIG. 1 is a fragmentary side-elevation view of a vehicle with a tri-fold convertible top made in accordance with the present invention in the extended, or covering, position.

Referring to FIG. 1, a vehicle 10 is shown with a convertible top 12 that is made in accordance with one embodiment of the present invention. The vehicle 10 includes a windshield header 16 to which the convertible top 12 is secured when the top 12 is in the extended position. The vehicle 10 has a belt line against which the convertible top 12 seals in the extended position. A tonneau 20 covers the convertible top 12 when it is in its retracted position. The tonneau 20 engages the decklid 22 when the convertible top 12 is in either the extended position or retracted position. A back light 24 is provided as part of the convertible top 12.

Referring to FIGS. 2-5, convertible top 12 is shown to include a one bow 25 that is secured to the forward end of a pair of front rails 26. As shown in FIGS. 2-5, only one side of the top stack linkage is shown, but it should be understood that a mirror image of the top stack linkage is provided on the opposite side of the vehicle from the illustrated portion. The front rail 26 is connected on its rear edge to a side rail 28. Side rail 28 is connected to a rear rail 30. The rear rail 30 is an L-shaped member that extends from the side rail 28 to the belt line 18 of the vehicle 10. The top stack linkage is secured to the vehicle 10 by a main pivot bracket 32. Main pivot bracket 32 is assembled to the vehicle 10 below the belt line 18.

The main pivot bracket 32 includes an outer flange 34 to which an L-shaped link 36 is secured. L-shaped link 36 is connected to a lower link 38. The L-shaped link 36 and lower link 38 connect the rear rail 30 to the main pivot bracket 32. A center link 40 is pivotally connected to an intermediate flange 42 of the main pivot bracket 32. The center link 40 is also pivotally connected to a pivot bracket 44 that extends rearwardly from the rear rail 30. The main pivot bracket 32 also includes an inner flange 48 to which an inner link 50 is connected. Inner link 50 is a generally L-shaped bracket that is pivotally connected to the inner flange 48 of the main pivot bracket 32 on one end and to the pivot bracket 44 on the rear rail 30 on its other end.

A balance link 52 is secured on its lower end to the inner flange 48 and is connected to an extension link 54 on its upper end. Extension link 54 connects the balance link 52 to the front rail bracket 56. Front rail bracket 56 is secured to the rear end of the front rail 26. A center rail front bracket 60 is attached to the side rail 28. Center rail front bracket 60 includes a slot 62 that receives an sliding pivot pin 64. Sliding pivot pin 64 is free to move within the slot 62 during the extension and retraction cycles. A two bow 66 is connected by a bow end connector 68 to the sliding pivot pin 64.

An upper rear rail bracket 70 is connected to the forward end of the rear rail 30. The upper rear rail bracket 70 is connected to upper pressure link 72 and lower pressure link 74. The pressure links 72, 74 apply pressure to the five bow 76 to drive the five bow 76 against the tonneau 20 or decklid 22. The five bow 76 is connected by a five bow connector 78 on its forward end. The five bow connector 78 extends from the pivot connection between the L-shaped link 36 and lower link 38 and provides a movable pivot point for the five bow 76.

A three bow 80 and four bow 82 are connected by bow end connectors 84 and 86, respectively, to the balance link 52. The bow end connectors 84 and 86 permit the three bow 80 and four bow 82 to pivot in a clockwise direction, as viewed in FIG. 2, as it is moved into the stored position. A side rear link 88 connects the upper rear rail bracket 70 to the rear rail 30.

Figure 2:
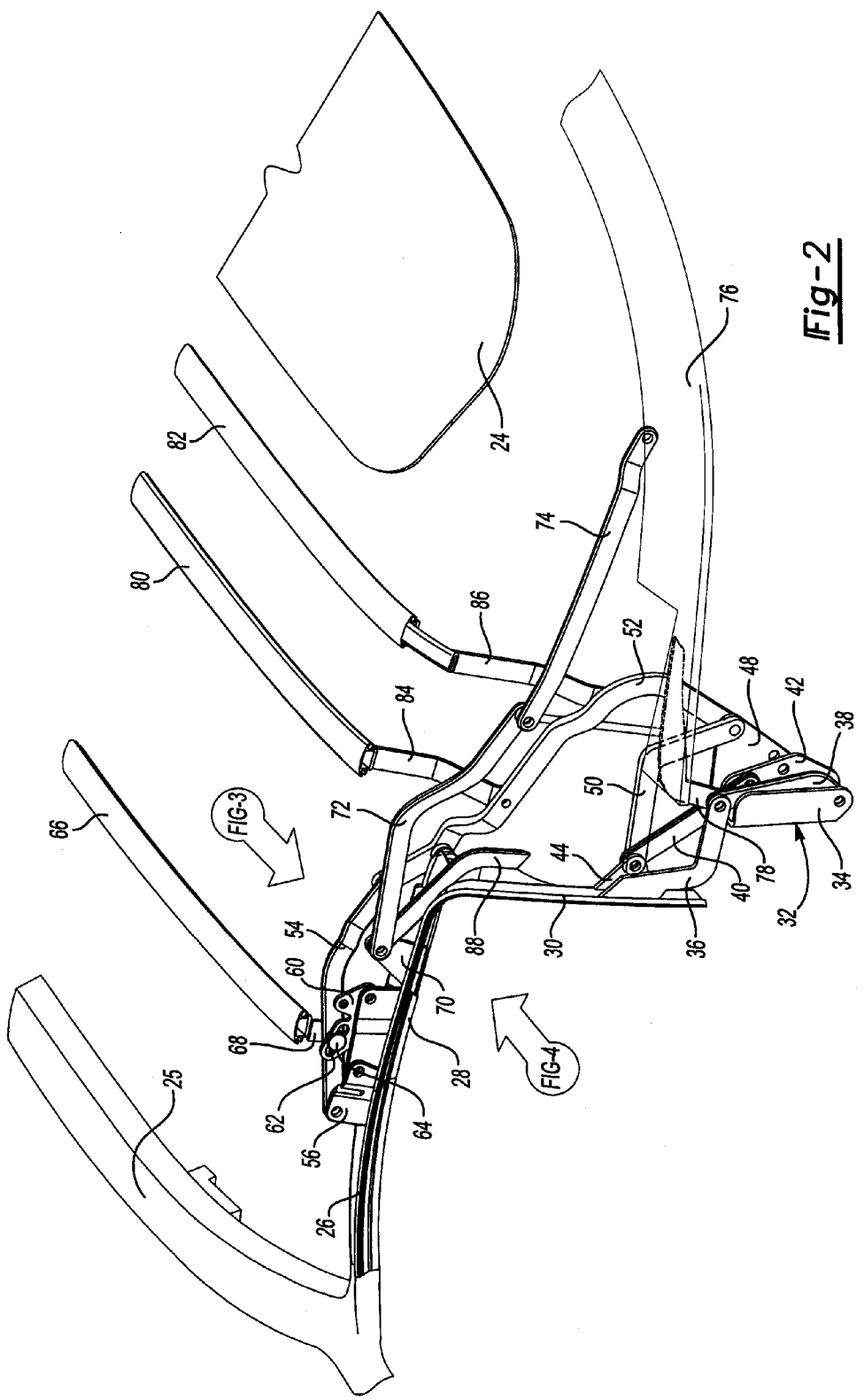
FIG. 2 is a rear side perspective view of one side of a tri-fold convertible top stack linkage made in accordance with one embodiment of the present invention.
Figure 3:
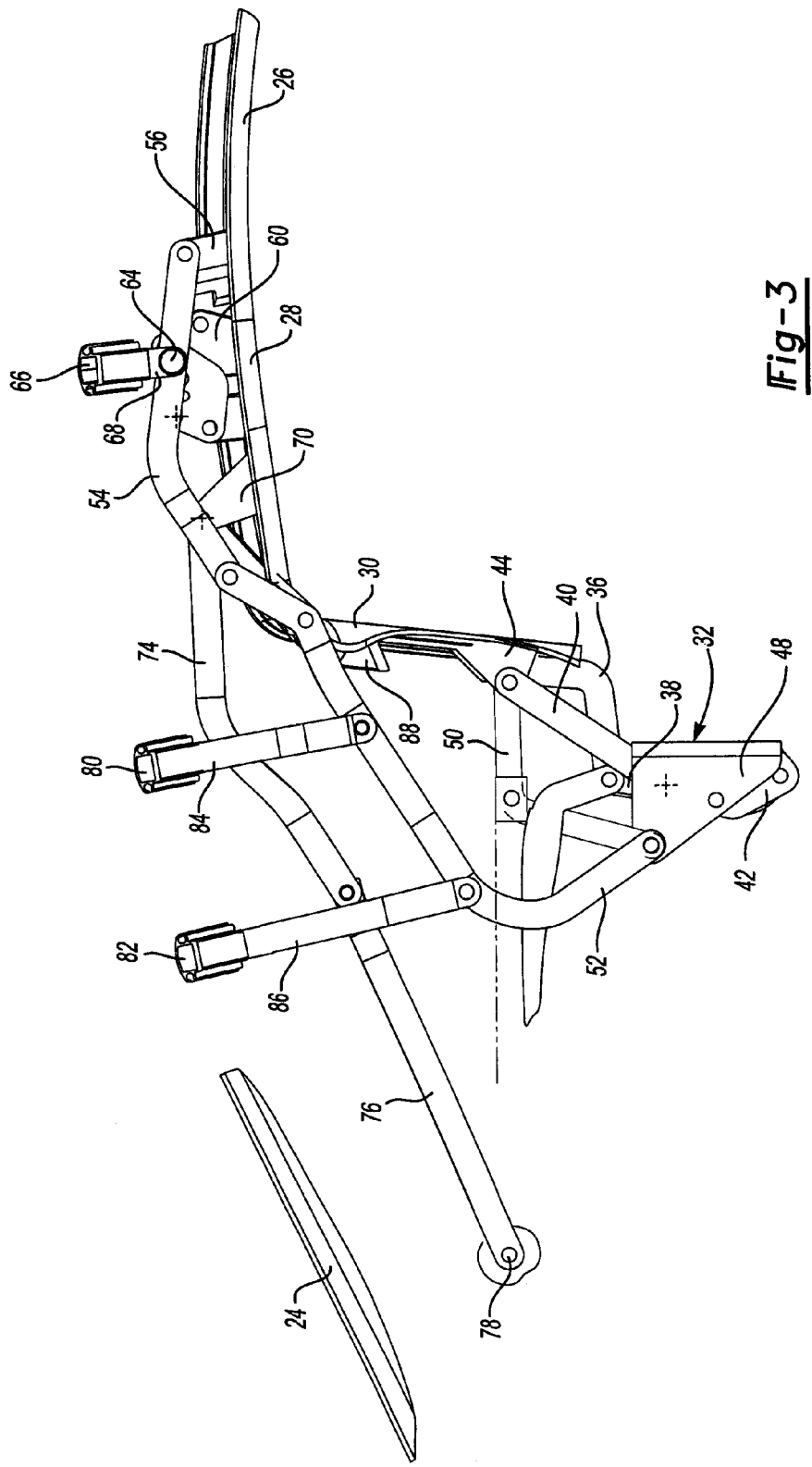
FIG. 3 is an inside elevation view taken from the standpoint of FIG. 3 in FIG. 2.
Figure 4:
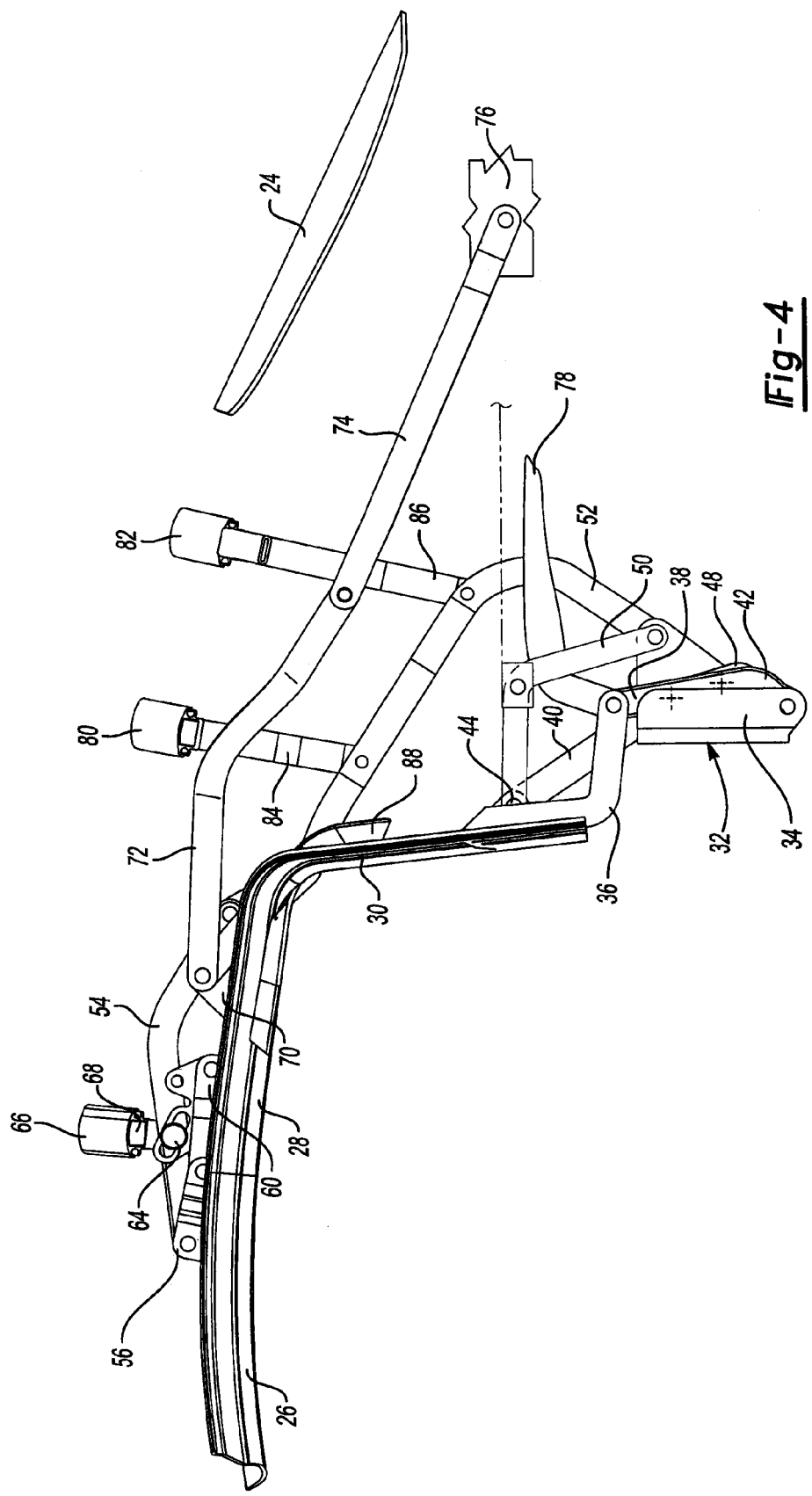
FIG. 4 is an outside side elevation view of the tri-fold convertible top linkage taken from the standpoint of FIG. 4 in FIG. 2.
Figure 5:
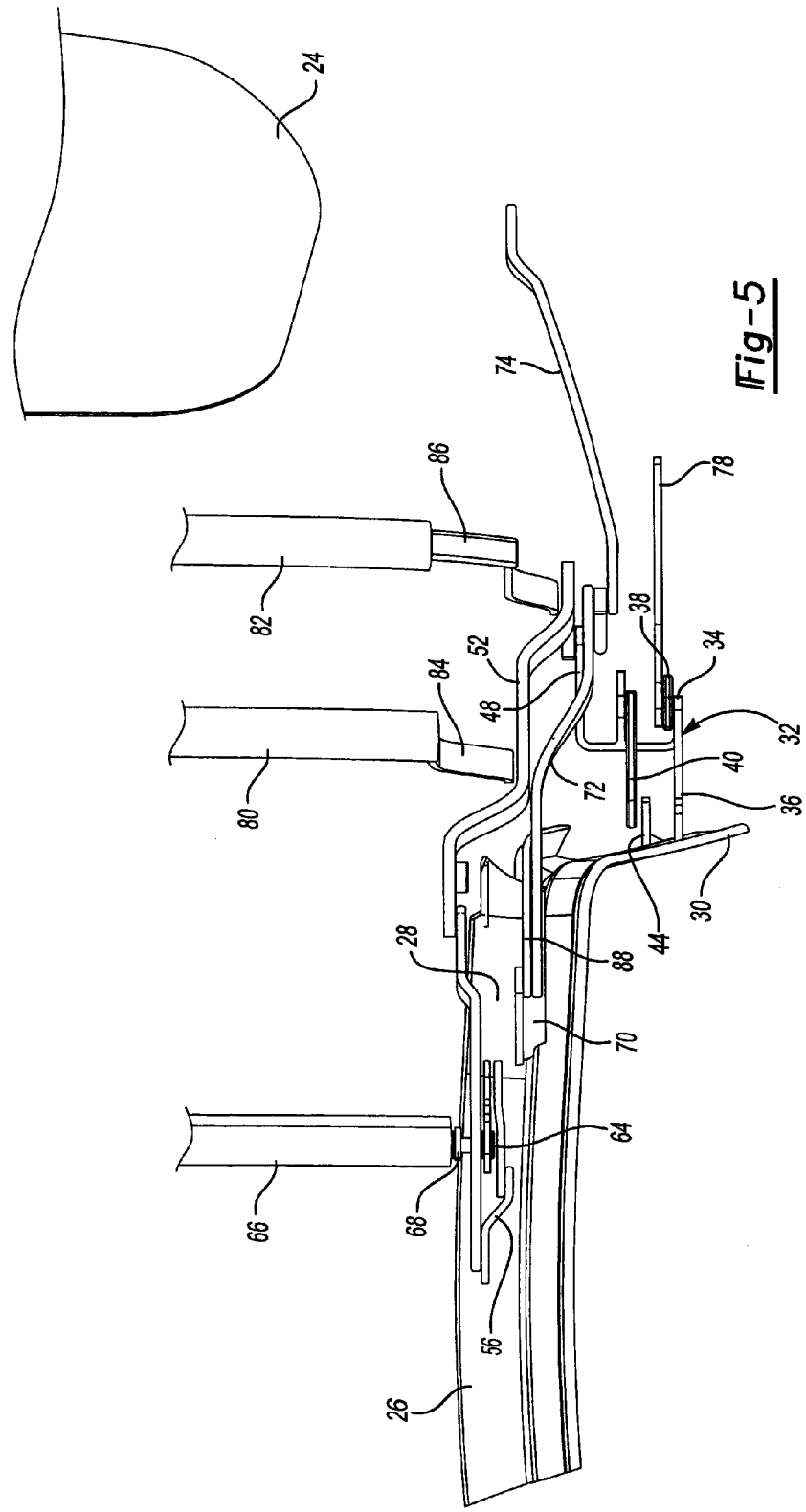
FIG. 5 is a fragmentary plan view of the tri-fold convertible top made in accordance with the embodiment of FIG. 2.

As shown in FIG. 2, the convertible top 12 is a manual convertible top. However, it should be understood that a lower drive cylinder could be provided that interconnects the main pivot bracket 32 to the rear rail 30 in a similar manner to the embodiment described with reference to FIGS. 6-14, below. In addition, an upper drive cylinder may be provided between the center rail front bracket and the rear rail 30 that raises the one bow 25 and front rail 26. The drive cylinder may also pivot the upper pressure link 72 relative to the lower pressure link 74 to raise the five bow 76. The upper drive cylinder releases the tension on the convertible top while the lower drive cylinder that is connected to the main pivot bracket rotates the top downwardly into a storage compartment.

In the retraction cycle, the front rail, as viewed in FIG. 2, rotates in a clockwise direction to a position generally disposed over the side rail 28. The side rail 28 and rear rail 30 also rotate in a clockwise direction, as viewed in FIG. 2, during the retraction cycle toward the storage compartment. The one bow 25 and five bow 76 are collapsed toward each other releasing tension on the convertible top cover. The retraction cycle continues by moving the pivot connection between the upper pressure link 72 and lower pressure link 74 downwardly toward the belt line 18. The L-shaped link 36 raises the bottom edge of the rear rail 30 during the retraction cycle above the belt line of the vehicle to clear the vehicle adjacent the main pivot bracket 32. The inner link 50 balances the movement of the rear rail 30 as it is lifted off of the belt line 18 of the vehicle 10. The pivot bracket 44 is moved in an arcuate path defined by the rotary movement of the center link 40 as it is moved into its retracted position.

The entire top 12 is stored at an angular orientation of between 30° and 60° in the storage compartment. The storage compartment may have a floor that is oriented at the same angle. The five bow 76 is oriented at approximately a 45° angle extending upwardly and rearwardly from the main pivot bracket 32. The rear rail 30 is compressed against the five bow 76 and the linkage including the one bow 25, two bow 66, three bow 80 and four bow 82 are stacked against the five bow 76 when the top is in its stored position.

Figure 6:
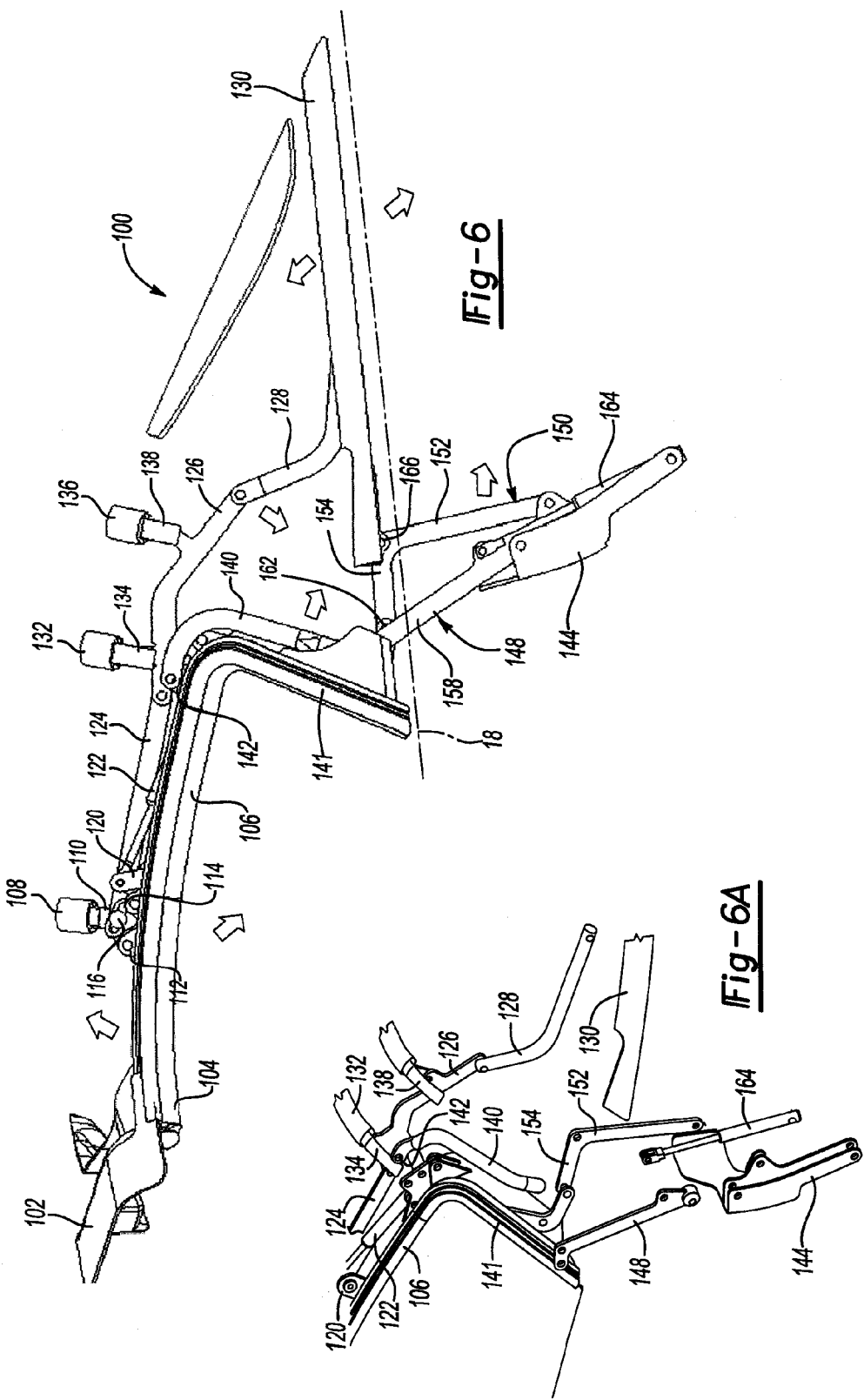
FIG. 6 is a side elevation view of an alternative embodiment of a top stack linkage including the drive cylinders and pivot bracket.
Figure 7:
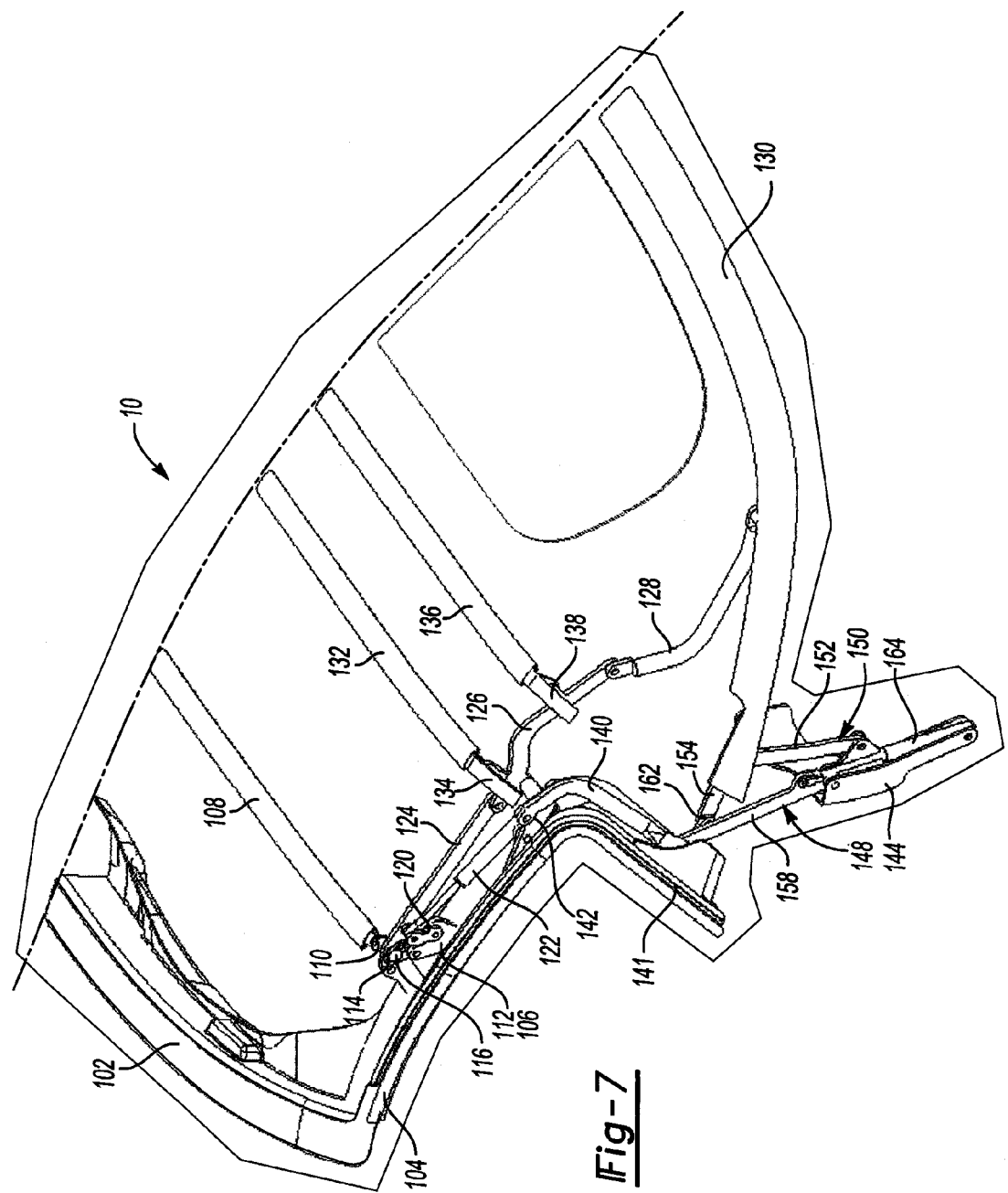
FIG. 7 is a rear side elevation view of the convertible top made in accordance with the embodiment of FIG. 6.

Referring to FIGS. 6, 6A and 7, two different views are provided of the left side of a convertible top stack linkage for an alternative embodiment of the convertible top 100. The convertible top 100 includes a one bow assembly 102. The one bow assembly 102, as are well known in the art, includes the one bow and latching mechanism for latching the one bow to a windshield header. The one bow assembly 102 is secured between front rails 104. One of the front rails 104 is shown in FIGS. 6 and 7, while the other front rail for the right side of the vehicle is not illustrated. The right-hand side of the top stack is essentially a mirror image of the left-hand side.

A front rail 104 is secured on its rear end to a forward end of a side rail 106. Side rail 106 supports the two bow 108. The two bow 108 is connected by a bow end connector 110 to the side rail 106. A front rail rear bracket 112 is provided at the rear end of the one bow. The front rail rear bracket 112 forms a four bar link mechanism that is used to lift the front rail 104 and rotate it in a clockwise direction, as viewed in FIGS. 6 and 7. A slot 114 is provided in the front rail rear bracket 112. The slot 114 receives a guide pin 116. A cylinder rod pivot 120 is provided on the side rail 106 and is connected to the rod of a top stack tensioning power cylinder 122.

A front extension link 124 is connected on its forward end to the drive pin 116. The rear end of the front extension link 124 is pivotally connected to an intermediate pressure link 126. Intermediate pressure link 126 is connected on its rear end to the front end of a rear pressure link 128. Rear pressure link 128 extends from the intermediate pressure link 126 to the five bow 130. The top stack is tensioned by the top stack tensioning power cylinder 122 that applies tensioning pressure to the one bow 102 and front rail 104 on the forward end, and to the links 126-128 on the rear portion of the convertible top 100.

A three bow 132 is connected by a bow end connector 134 to the intermediate pressure link 126. A four bow 136 is connected by a bow end connector 138 to an intermediate portion of the intermediate pressure link 126.

A rear balance link 140 is connected to the top behind the rear rail 141. The balance link 140 is connected on its upper end to a upper rear rail bracket 142.

A main pivot bracket 144 is secured to the vehicle at a location substantially below the belt line 18 of the vehicle. A forward main pivot link 148 is connected to the main pivot bracket 144 on its lower end. A rearward main pivot link 150 is connected to the main pivot bracket 144 at a location behind and below the pivot link 148. The rearward main pivot link 150 has a first leg 152 and a second leg 154 that together form the L-shape of the main pivot link 150. The first leg 152 extends from the second leg to the main pivot bracket 144. The second leg 154 of the forward main pivot link 148 extends from the first leg 152 toward the rear rail 141. The forward main pivot link 148 includes a main pivot link 158 that can be seen in FIGS. 6 and 7. The forward and rearward main pivot links 148 and 150 are rotated in a clockwise direction during the retraction cycle, as viewed in FIGS. 6 and 7. As the pivot links 148, 150 rotate for retraction, the rear rail 141 is lifted above the belt line 18 in the course of being moved into a storage compartment. The second leg 154 is connected to a lower rear rail pivot bracket 162 and is fixedly connected and extends rearwardly from the rear rail 141. A main power cylinder 164 is provided on the main pivot bracket 144 and is secured at a lower end of the main pivot bracket 144. The cylinder 164 is also connected to the main pivot leg 158 of the forward main pivot link 148. The five bow 130 is connected at a five bow pivot 166 to the rearward main pivot link 152 at the intersection of the first leg 152 and second leg 154.

Figure 8:
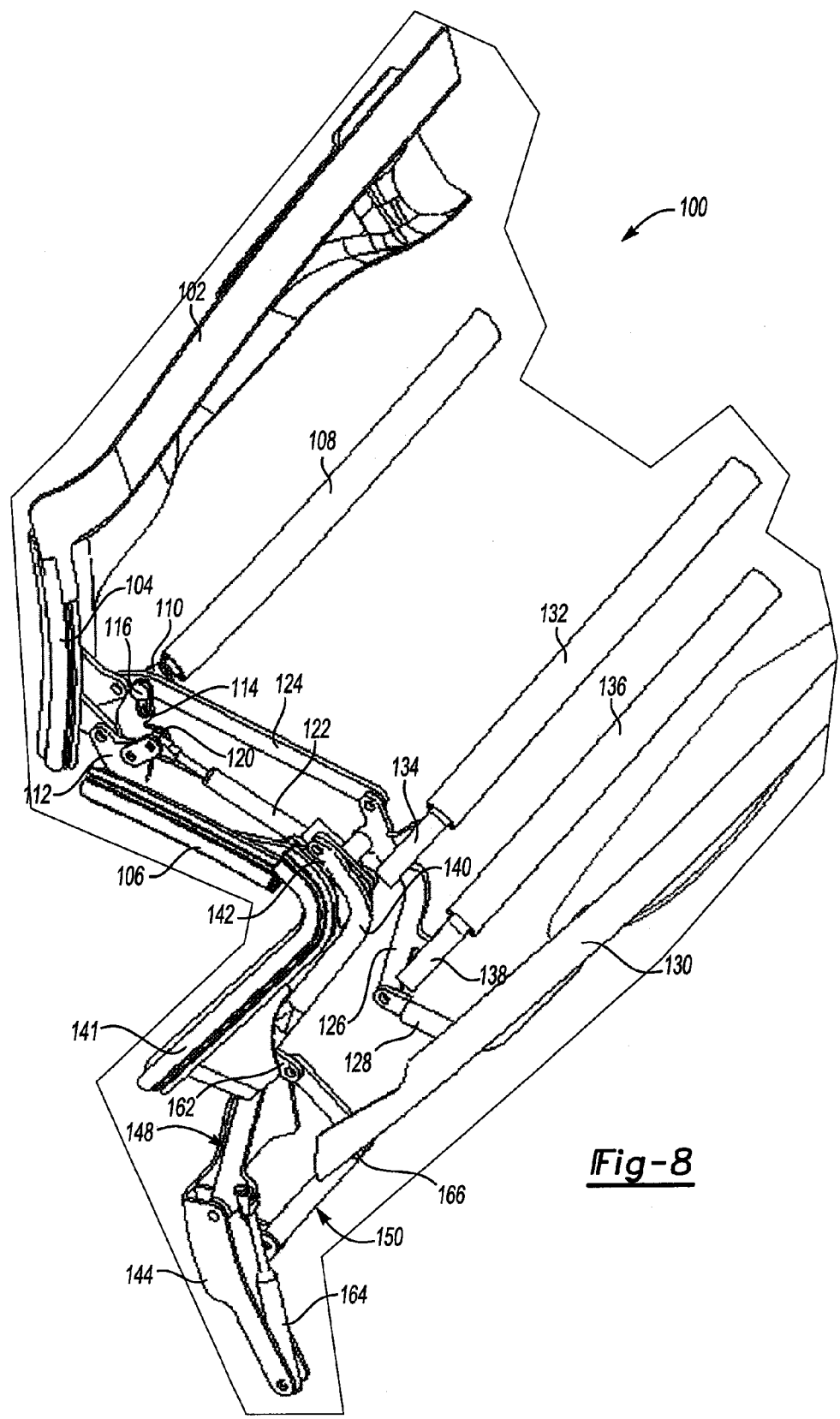
FIG. 8 is a rear side perspective view of one side of a tri-fold convertible top of FIG. 6 in its partially retracted position.

Referring to FIG. 8, the alternative embodiment of the top 100 is shown partially retracted. The one bow assembly 102 is shown secured to one of the front rails 104. The front rail 104 is shown in a generally vertical orientation. As shown in FIG. 8, the one bow 102 and front rail 104 are lifted and rotated in a clockwise direction by the action of the top stack tensioning power cylinder 122. The tensioning power cylinder 122 acts upon the front rail 104 to lift the one bow 102 from the windshield header. The tensioning power cylinder 122 also acts on the front extension link 124 that pulls back on the guide pin 116 that is secured within the slot 114. The intermediate pressure link 126 rotates downwardly on its rear end where it is pivoted to the rear pressure link 128. The pivot point between the intermediate pressure link 126 and rear pressure link 128 is lower during the extension and retraction cycle, which causes the rear pressure link 128 to rotate in a counter-clockwise direction carrying the one bow 130. Three bow 132 and four bow 136 are connected to the intermediate pressure link 126 by means of their respective bow end connectors 134 and 138.

Referring to FIG. 8, the forward main pivot link 148 and rearward main pivot link 150 form two opposed bars of a four bar link. The four bar link, including the main pivot links 148 and 150, rotate during the retraction cycle in the clockwise direction as viewed in FIG. 8. The linkage lifts the rear rail 141 to clear the belt line area of the vehicle. The forward main pivot link 148 and rearward main pivot link 150 are connected on their upper end to lower rear rail pivot bracket 162.

The operation of the top is also controlled by a main power cylinder 164 that is mounted on the main pivot bracket 144. The main power cylinder 164 cooperates with the top stack tensioning power cylinder 122. The main power cylinder 160 pulls the forward main pivot link 148 rearwardly in a clockwise direction, as viewed in FIG. 8. The movement of the power cylinder 160 lifts the rear rail 141 and rotates it in a clockwise direction to move into the storage compartment. The rear rail 141 is driven by the pivot links 148 and 150 to engage the five bow 130, which forces the five bow 130 into the storage compartment with the other components of the top stack when the top is stored.

Figure 9:
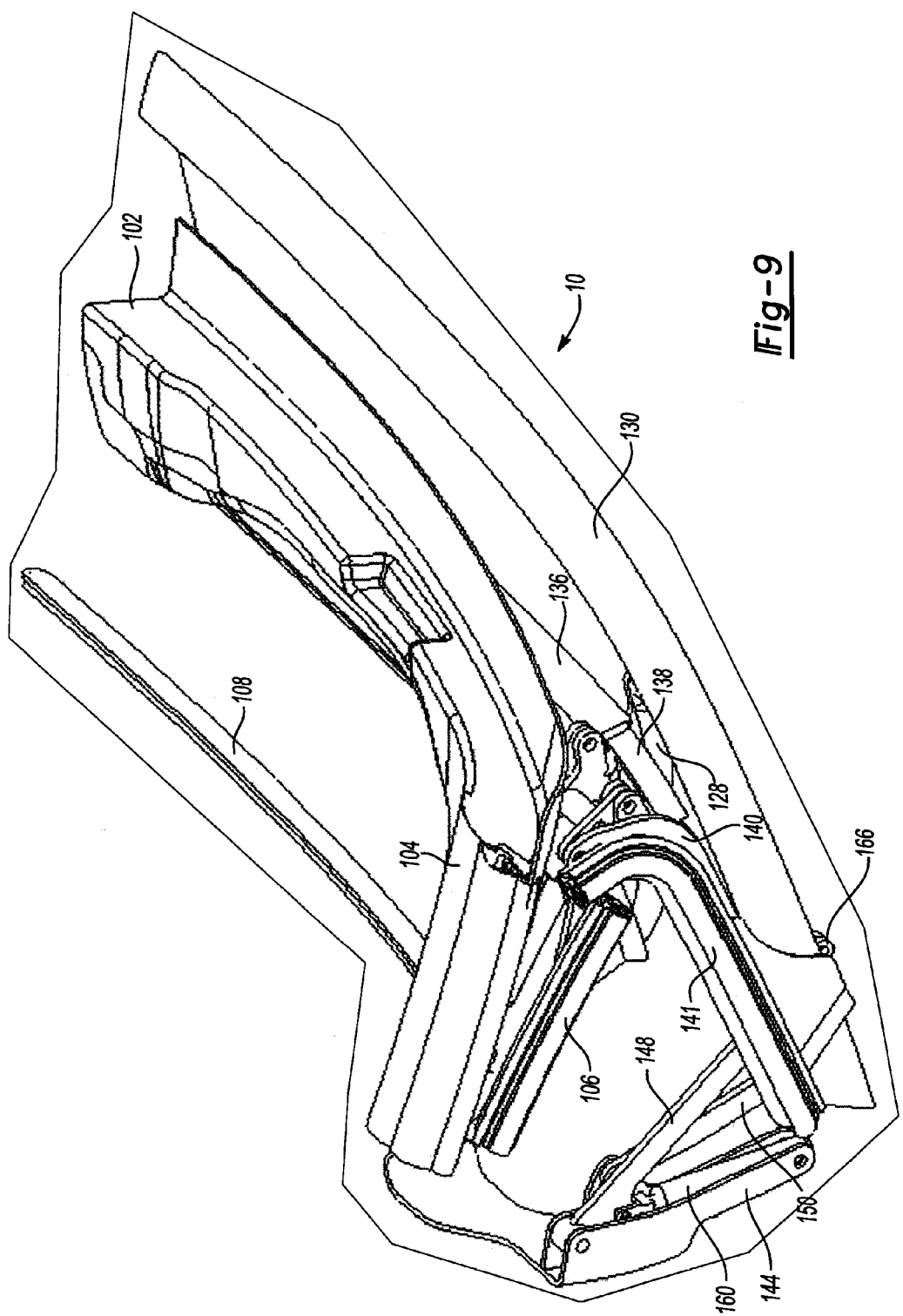
FIG. 9 is a fragmentary rear side perspective view of the tri-fold convertible top of FIG. 6 in its retracted position in the storage compartment.

Referring to FIG. 9, the top stack is shown in its stowed position. In the stowed position, the one bow 102 and front rail 104 overlie the side rail 106 and rear rail 141. The rear rail 141 overlies the five bow 130 that is oriented in a angular orientation relative to horizontal. The angle of inclination of the five bow 130 is between 30° and 60° relative to a plane defining the belt line of the vehicle. In this way, the five bow 130 is raised at the rear portion of the stowed convertible top to increase the available storage space below and rearward of the five bow 130. The storage compartment may include a floor that is oriented at approximately the same angle as the rear bow when in the stored position. The four bow 136 is stored between the one bow 102 and five bow 130 in the storage compartment. The main pivot bracket 144 and power cylinder 160 are shown with the power cylinder in its retracted position. In this position, the forward main pivot link 148 and rearward main pivot link 150 are generally inverted and extend rearwardly and downwardly from their connection points to the main pivot bracket 144. In this position, the five bow 130 and rear rail 141 are stored with their forward ends angled downwardly and are positioned below the main pivot bracket 144.

Referring to FIGS. 10-14, the alternative embodiment of the convertible top 100 is shown in several retraction positions with some parts removed for improved visibility of the illustrated parts.

Figure 10:
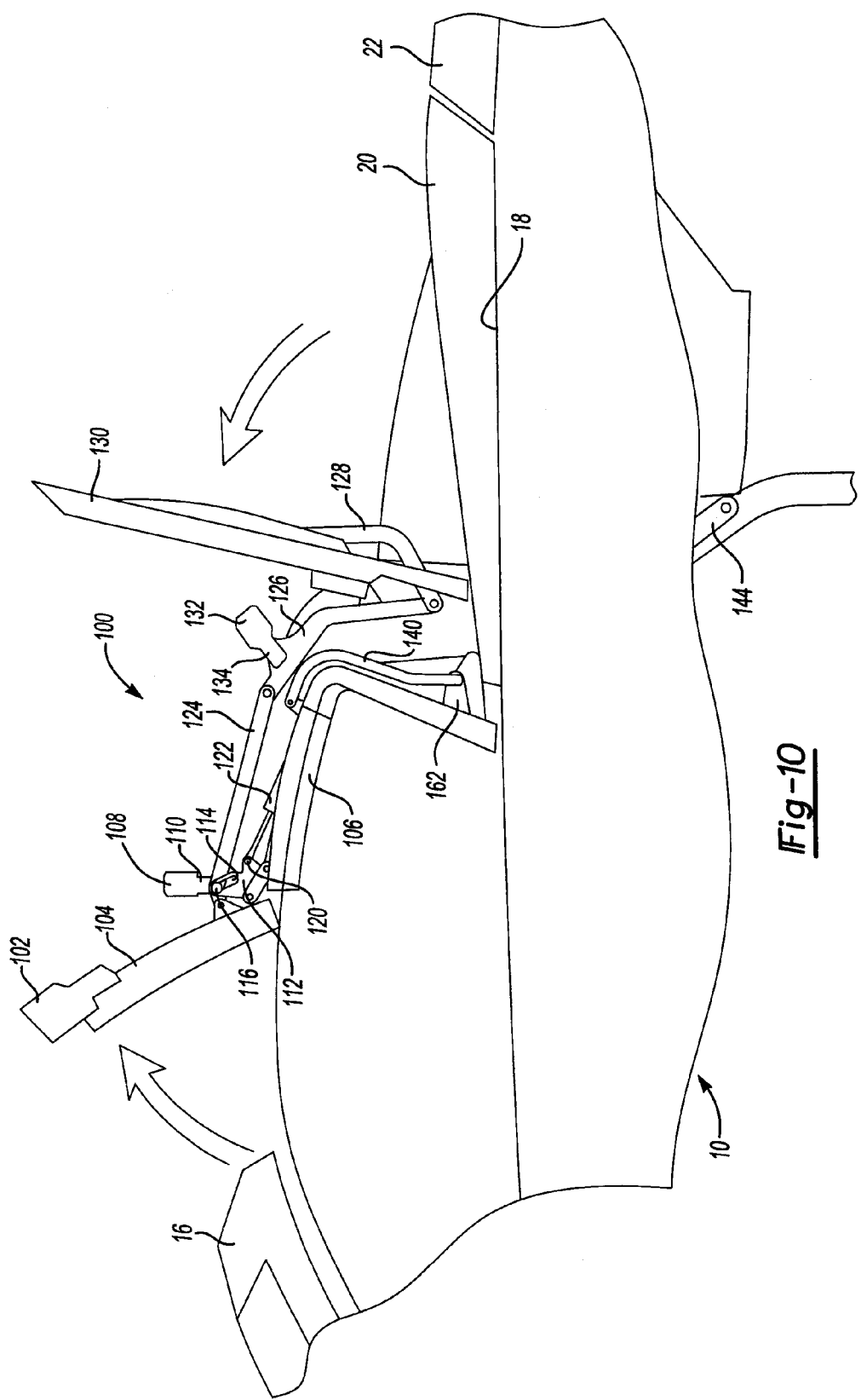
FIG. 10 is a side elevation view of the embodiment shown in FIG. 6 of a tri-fold convertible top in a partially retracted position.

In the position shown in FIG. 10, the top stack tensioning power cylinder 122 is partially retracted which causes the one bow 102 and the front rail 104 to rotate in a clockwise direction, as viewed in FIG. 10. The cylinder 122 also acts through the front extension link 124, intermediate pressure link 126 and rear pressure link 128 to rotate the five bow 130 in a counter-clockwise direction as shown by the directional arrow. With the five bow 130 raised, clearance is provided to pivotally raise the tonneau cover 20, as shown in FIG. 11 below.

Figure 11:
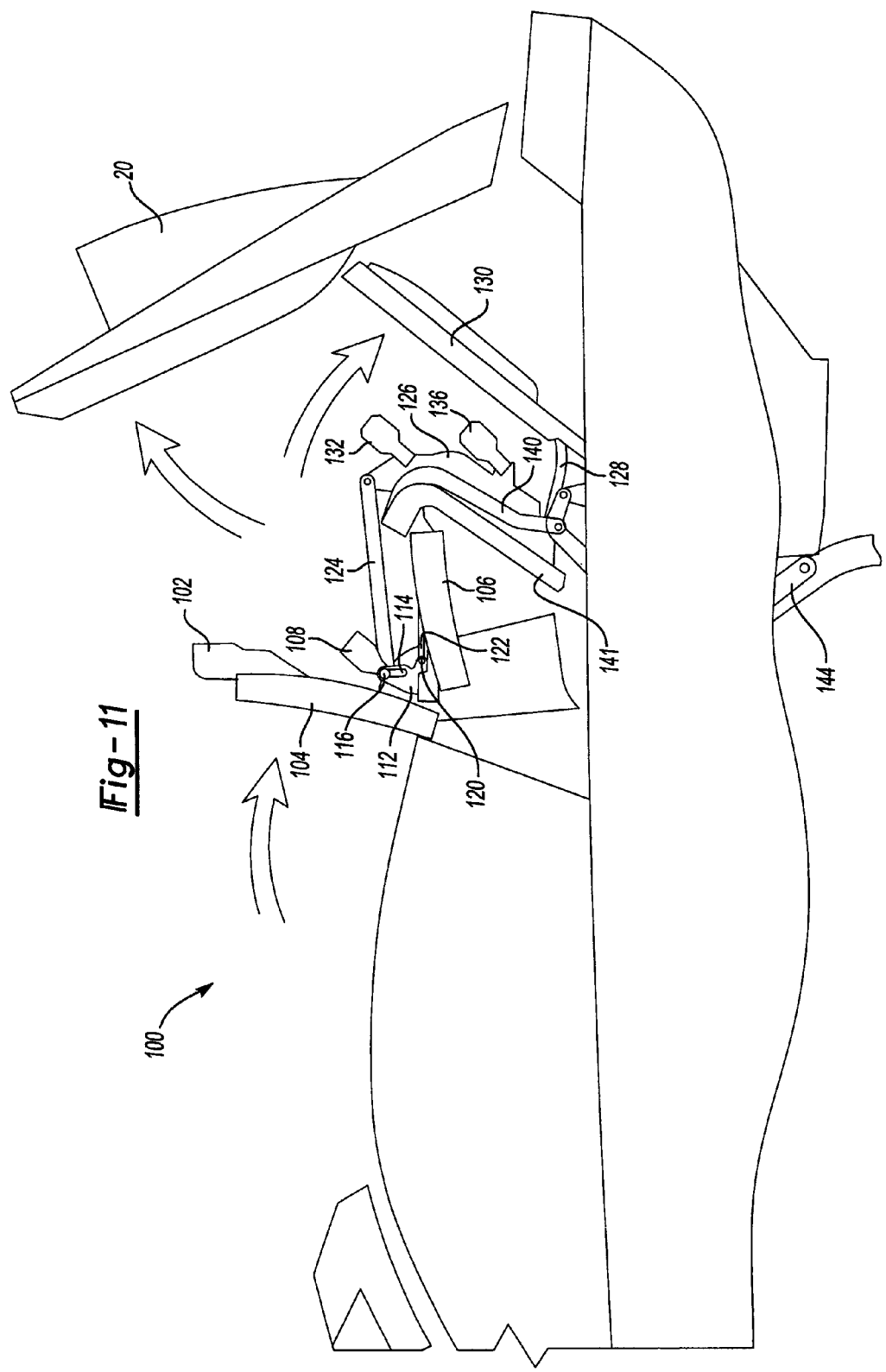
FIG. 11 is a fragmentary side elevation view of the embodiment of a tri-fold convertible top shown in FIG. 6 in its mid cycle retraction position.

Referring to FIG. 11, the tonneau 20 is shown in its raised position and the five bow 130 is shown being lowered into the storage compartment. The main power cylinder 164 causes the top to be further retracted into the storage compartment and lowered into an angular orientation within the storage compartment. The rear rail 141 and balance link 140 are rotated in a clockwise direction pulling the side rail 106 and front rail 104 rearwardly and downwardly into the storage compartment. The two bow 108, three bow 132 and four bow 136 are also moved rearwardly and downwardly into the storage compartment, as shown.

Figure 12:
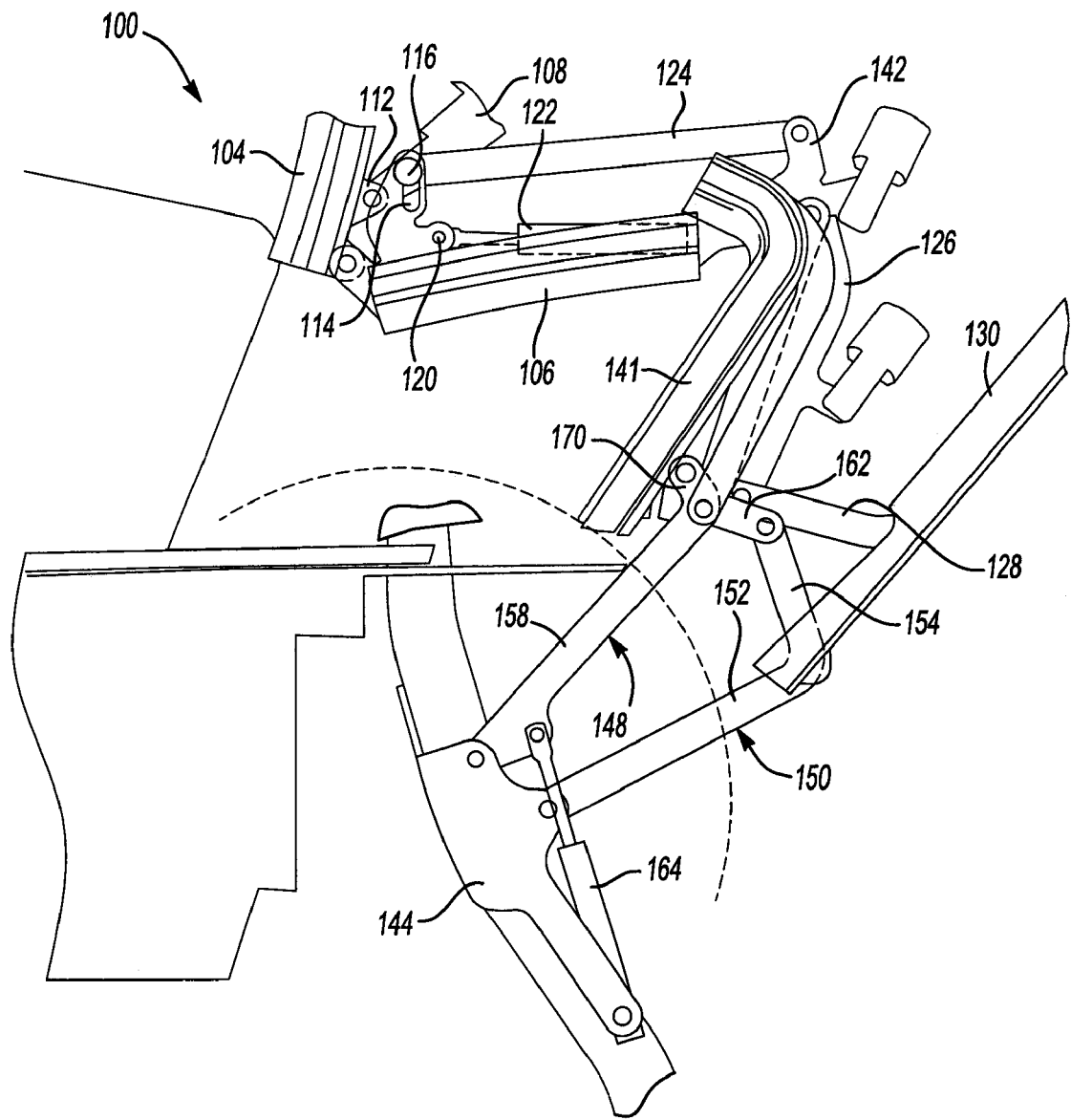
FIG. 12 is a fragmentary side elevation view of the top stack linkage for the embodiment of the tri-fold convertible top shown in FIG. 6 in its mid cycle retraction position.

Referring to FIG. 12, the alternative embodiment of the top stack is shown in its nearly fully retracted position. In this position, the power cylinder 164 pulls the forward main pivot link 148 downwardly and the pivot link 148 and pivot link 150 form two opposite sides of a four bar link that lift the rear rail 141 on an arcuate path shown by the dashed lines in FIG. 12. The rear rail 141 is permitted to clear the edge of the storage compartment as a result of being lifted over the belt line by the linkage including links 148 and 150. In FIG. 12, the front rail 104 is rotated in a clockwise direction, while the side rail 106 rotates downwardly in counter-clockwise direction. In the meantime, the rear rail rotates in a clockwise direction to a position stored against the five bow 130.

Figure 13:
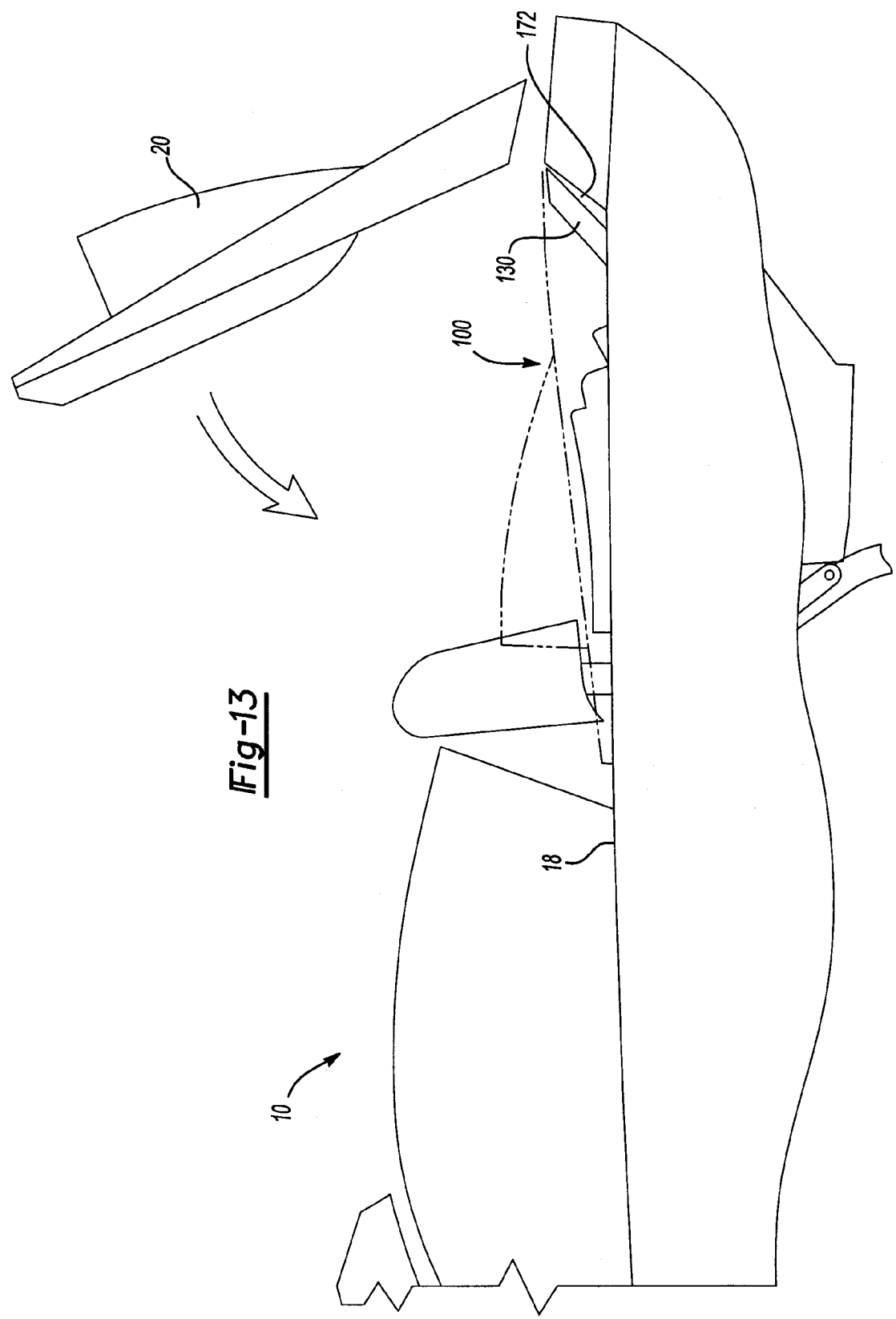
FIG. 13 is a fragmentary side elevation view of the embodiment of a tri-fold convertible top shown in FIG. 6 in its stored position with the tonneau cover being lowered over the storage compartment.

Referring to FIG. 13, a vehicle 10 is shown with a convertible top 100 stored in a storage area with the five bow 130 stored against the storage compartment floor 172. The tonneau 20 is shown in its raised position as it is moved toward the closed position shown in phantom lines in FIG. 14. The tonneau cover 20 in its lowered position is located adjacent the belt line 18 of the vehicle 10.

Figure 14:
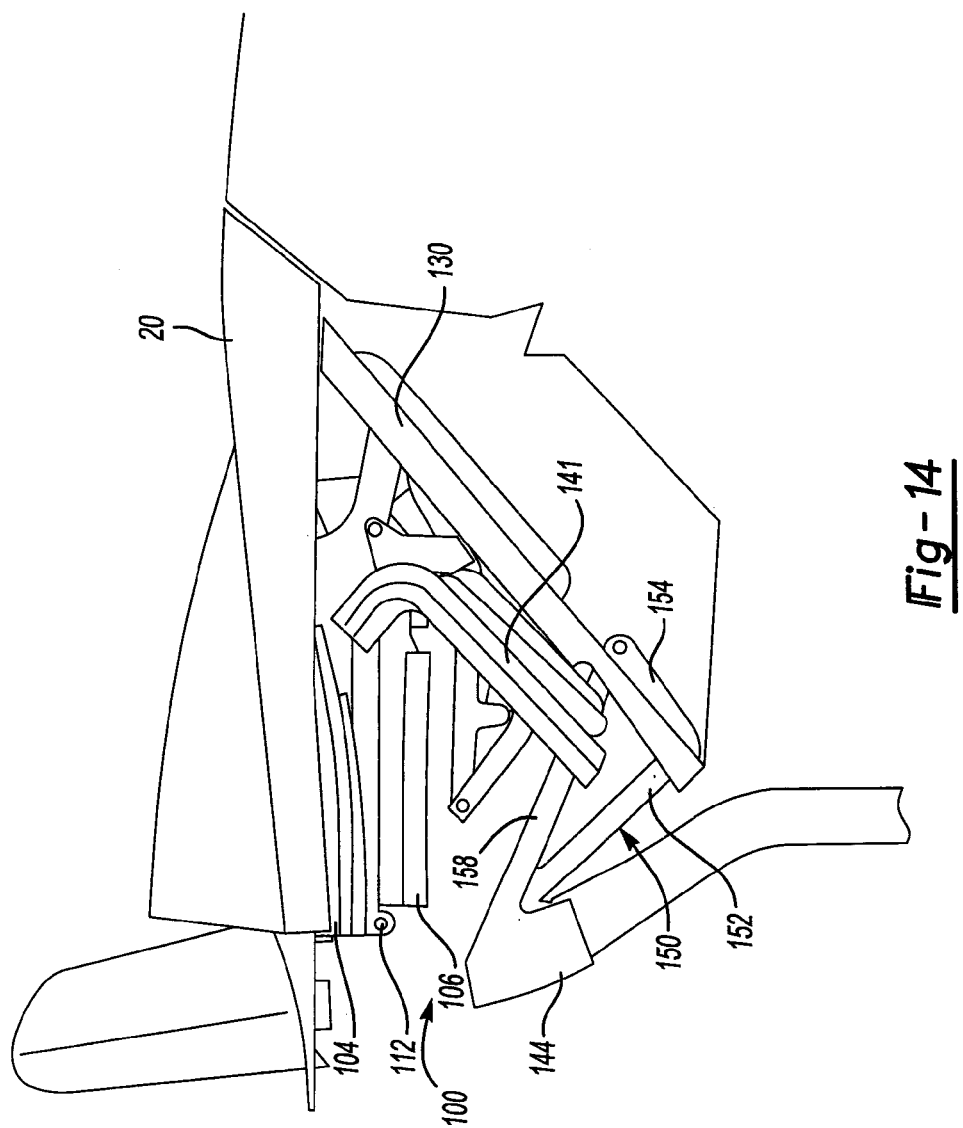
FIG. 14 is a fragmentary side elevation view of the tri-fold convertible top of FIG. 6 in its fully retracted position with the tonneau cover closed over the stored convertible top.

Referring to FIG. 14, the top stack of the convertible top 100 is shown stowed in the storage compartment with the tonneau 20 closed over the stored convertible top 100. In this position, the five bow 130 is stored at approximately a 45° angle relative to the belt line of the vehicle. The rear rail is stored against the five bow. The forward main pivot link 148 and rearward main pivot link 150 are shown generally inverted from their extended position relative to the main pivot 144. The second leg 154 of the pivot link 150 is generally parallel to the five bow 130. In this arrangement, the convertible top 100 as stored is confined to a triangularly shaped region. A storage compartment may be provided that has a floor oriented to receive the five bow 130 and the second leg 154 of the pivot link 150 in a flush, contacting relationship. The front rail 104 is stored above the side rail 106 in a generally horizontal orientation below the tonneau 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle comprising:
   a front rail that is inverted by rotating in a first rotary direction as the roof is retracted by the action of a first four bar link;
   a side rail that forms part of the first four bar link and is rotated in a second rotary direction that is opposite the first rotary direction as the roof is retracted;
   a rear rail that forms part of a second four bar link and rotates in the first rotary direction as the roof is retracted;
   a vehicle engaging bow that is rotated in the second rotary direction as the roof is refracted;
   the vehicle engaging bow being operatively connected to the rear rail and the first four bar link that initially lifts the vehicle engaging bow in the second rotary direction as the roof is refracted and that then lowers the vehicle engaging bow in the first rotary direction into a storage compartment, wherein the vehicle engaging bow is oriented at an angle of between 30° and 60° relative to a plane defining the beltline of the vehicle with the vehicle engaging bow being inclined upwardly and rearwardly from a pair of main pivot brackets; and
   wherein the second four bar link compresses the front roof rail, side rail, and rear rail into engagement with the vehicle engaging bow when the top is fully retracted and stowed in said storage compartment.

2. The convertible top of claim 1 further comprising a top stack power cylinder that is operatively connected between the first four bar link and the vehicle engaging bow to lift the first four bar link during the retraction cycle and to tension the vehicle engaging bow when the top is extended.

3. The convertible top of claim 1 wherein the storage compartment that has a bottom wall that is oriented at an angle of between 30° and 60° relative to a plane defining the belt line of the vehicle.

4. The convertible top of claim 1 wherein the second four bar link further comprises a balance link that forms the opposite link relative to the rear rail, and the rear rail and balance link are assembled to a main pivot bracket.

5. A convertible top for a vehicle having a windshield header and a rear deck lid that is at a belt line of the vehicle, the vehicle having a storage compartment for the top, the top comprising:
   a roof cover that extends from the windshield header to the rear deck lid when the top is extended;
   a linkage that supports the roof cover, the linkage including a rearmost bow that is disposed to lie upon the rear deck lid at the belt line when the top is extended, the rearmost bow being rotated by the linkage to be disposed at an angle of between 30° and 60° relative to the belt line when the top is retracted into the storage compartment, wherein the rearmost bow is raised above its forward most portion at a rear portion of the stored convertible top to maximize availability of a storage space below and rearward of the rearmost bow;
   a one bow supported between two front roof rails that is selectively secured to the windshield header, the one bow and front rails being moved by a first pair of four bar links;
   two side rails each secured on a forward end of the side rails to one of the front rails, wherein the side rails and a fore and aft control link form part of the first pair of four bar links;
   two rear rails each secured on an upper end of the rear rails to one of the side rails;
   two balance links each secured to one of the fore and aft control links, wherein the rear rail and balance link form part of a second pair of four bar links that are each operatively connected to the first four bar link; and
   a third pair of four bar links connecting the second pair of four bar links and a pair of main pivot brackets that are attached to the vehicle below the belt line of the vehicle.

6. The convertible top of claim 5 wherein the storage compartment has a floor that is disposed at substantially the same angular orientation as the vehicle engaging bow.

7. The convertible top of claim 5 further comprising a power cylinder operatively connected to at least one of the third pair of four bar links that act on the third pair of four bar links to lift a lower end of the rear rails above the belt line of the vehicle during an extension cycle and a retraction cycle.

8. The convertible top of claim 5 further comprising a vehicle engaging bow that is disposed to lie upon the vehicle at the belt line when the top is extended and which is raised during the extension cycle and refraction cycle, the vehicle engaging bow being disposed in a storage compartment when the top is refracted.

9. The convertible top of claim 8 further comprising a pressure link connected to the vehicle engaging bow and the second four bar link when the top is extended and which lifts the vehicle engaging bow during the extension cycle and retraction cycle.

10. The convertible top of claim 5 wherein the third pair of four bar links each include a front link and a rear link, the front link being connected to the rear rail and the balance link on an upper end of the front link, and the rear link being connected to the rear rail and the vehicle engaging bow on an upper end of the rear link to control the motion of the rear rail and balance link.

11. The convertible top of claim 10 wherein the upper end of the front link is generally an inverted L-shaped member with a base leg extending in the forward vehicle direction, the rear rail is attached to the front end of the base leg, and the balance link is attached to the base leg behind the attachment point of the rear rail.

* * * * *